Feb. 23, 1965   E. L. ADAMS   3,170,970
METHOD FOR MAKING PLASTIC ARTICLES
Filed Jan. 23, 1962   2 Sheets-Sheet 1

INVENTOR.
ELMER L. ADAMS, DECEASED
by WANDA J. ADAMS, EXECUTRIX
BY SPENCER L. BLAYLOCK JR.
&
W.A. SCHAICH
ATTORNEYS

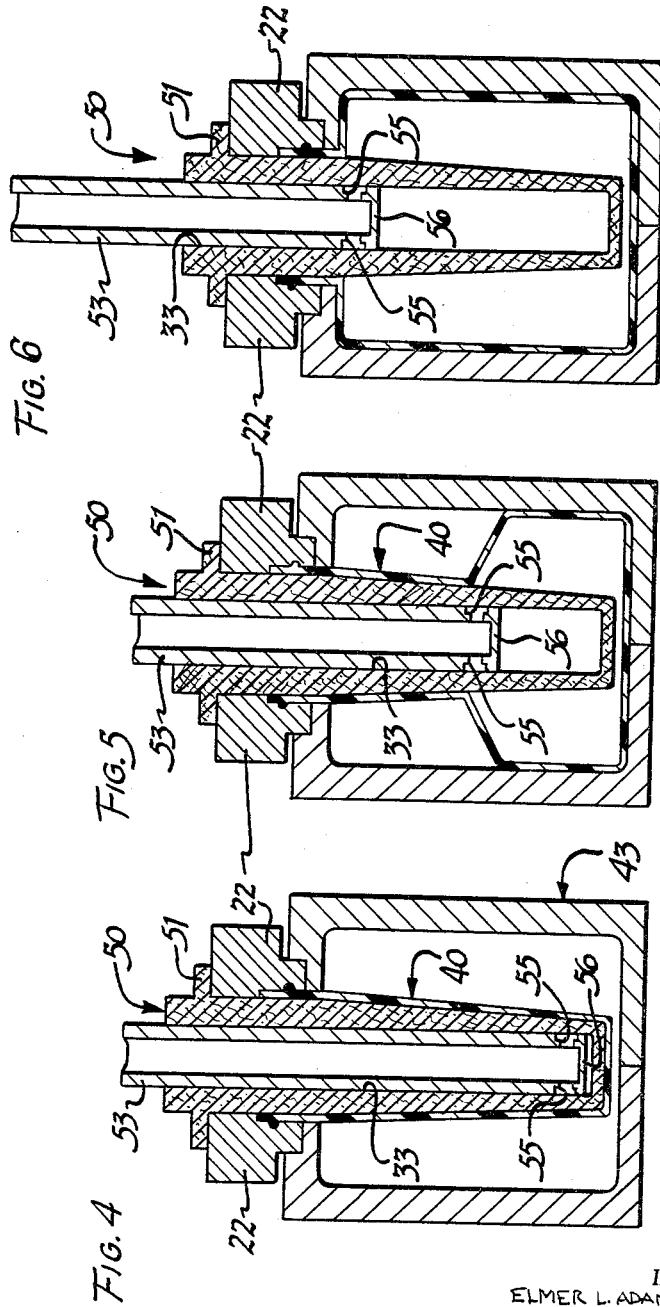

United States Patent Office

3,170,970
METHOD FOR MAKING PLASTIC ARTICLES
Elmer L. Adams, deceased, late of Toledo, Ohio, by Wanda J. Adams, executrix, Toledo, Ohio, assignor to Owens-Illinois Glass Company, a corporation of Ohio
Filed Jan. 23, 1962, Ser. No. 169,174
4 Claims. (Cl. 264—94)

The present invention relates to a method of making plastic articles and more particularly to the manufacture of plastic articles from a blank or parison injection molded about a porous core through which blow air is introduced for blowing the blank to its final configuration.

In the copending application of Thomas R. Santelli, Serial No. 146,686, filed October 17, 1961, now abandoned, and assigned to the assignee of the present invention, there is disclosed and claimed a plastic article and a method of making such an article from a blank or parison which is injection molded at relatively low pressures and without the formation of a highly stressed parison "gate" portion usually encountered in injection molded articles. Generally, the method of so injection molding the parison or blank involves the filling of the parison mold and the formation of the parison therein under the pressure exerted by a piston or other pressure element of relatively large dimension and preferably conforming substantially to one full dimension of the parison.

The parison is formed about a central core pin, this pin remaining in the parison during transfer of the parison to a blowing station and forming the means whereby blow air is introduced into the parison. For this purpose, the core pin is provided with various forms of valves for admitting and controlling air flow into the parison. Care must be taken in the design of the core pin to prevent sticking of the parison to the core pin during attempted inflation. Additionally, the valving arrangements utilized are such that the initial blowing of air exerts the full blow air pressure upon relatively small surface areas of the parison, at least initially, and a "blow-out" or rupture of the parison may occur.

The present invention utilizes a new and novel form of core pin for preventing sticking of the parison thereto and preventing any possible "blow-out" of the parison. Additionally, the core pin used in the present invention can be utilized to progressively blow the parison from the core pin and against the chill walls of the blow mold in a controlled manner not heretofore possible. Further, if desired, a mold release agent can be utilized in conjunction with the core pin to facilitate the release of the parison therefrom without "blow-out."

More specifically, the present invention proposes the utilization of a porous core pin which is fluid pervious or, at least, gas-permeable. The core pin exterior contour conforms to the desired interior shape of the parison and forms the mold core about which the parison is injection molded. The pores in the core pin are minute and are of such size as to prohibit the entry of plasticized plastic material thereinto during injection molding of the parison. The fact that injection molding, as carried out in accordance with the above-identified Santelli application, occurs at relatively low injection pressures further aids in prevention of filling and plugging of the pores with plasticized material during parison formation.

To introduce blow air into the parison after it has been transferred by means of the core pin to a blow molding station, it is only necessary to introduce air into the hollow center of the core pin. The air will travel through the air-permeable core pin to inflate the surrounding parison and to move the parison outwardly from the core pin to the walls of the enclosing sectional blow mold.

In one modification of the present invention, an air tube may be inserted axially into the hollow center of the core pin, and this air tube serves to direct air against only a restricted portion of the core pin for travel therethrough outwardly to inflate the parison. By moving the air tube axially within the core pin, successive axially spaced portions of the parison can be successively moved outwardly into contact with the surrounding blow mold and quite desirable material distribution in the walls of the blown article can be obtained.

It is, therefore, an important object of the present invention to provide a new and novel method of manufacturing a blow molded plastic article from an injection molded parison formed about a gas permeable core pin.

Another important object of this invention is the provision of an improved method of making a blown plastic article by injection molding a parison about a porous core pin, transferring the parison to a blow molding station, and inflating the parison at the blow molding station by air introduced into the parison through the core pin.

It is a further object of this invention to provide an improved method for making a blow molded article including a porous core pin about which a parison is injection molded and through which the parison is inflated for blow molding.

It is a further, and no less important, object of the present invention to provide a new and improved method of making a blow molded article by injection molding a parison about a central porous core pin and inflating the injection molded parison by fluid under pressure introduced into the parison through the core pin by means of an air tube axially displaceable interiorly of the core pin to successively inflate axially spaced portions of the parison.

A still further and important object of this invention is the provision of a porous core pin upon which a parison is injection molded and through which the parison is subsequently inflated, the core pin accommodating the ready stripping of the parison from the core pin and preventing any "blow-out" of the parison during inflation.

Other objects of this invention will appear in the following description and appended claims, reference being had to the accompanying drawings forming a part of this specification wherein like reference characters designate corresponding parts in the several views.

On the drawings:

FIGURE 4 is a view similar to FIGURE 3 but illustrating a different form of a core pin provided with an air tube for inflation of the parison during blow molding;

FIGURE 5 is a view similar to FIGURE 4 illustrating an intermediate stage of the blow molding operation; and FIGURE 6 is a view similar to FIGURES 4 and 5 illustrating termination of the blow molding operation.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Figure 1:
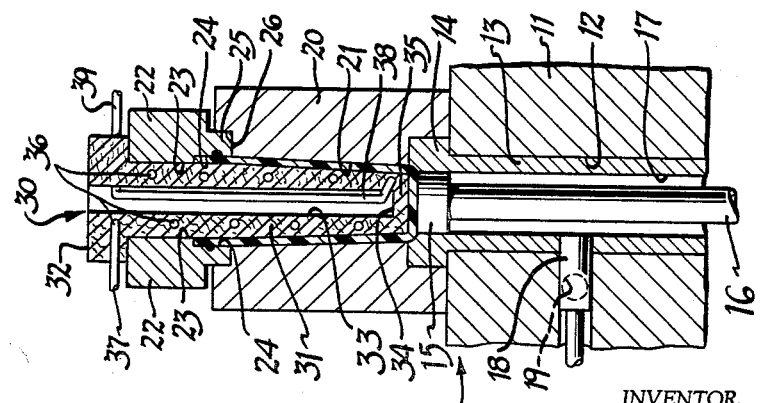
FIGURE 1 is a fragmentary, somewhat schematic representation of an apparatus of the present invention utilizing a porous core pin capable of carrying out the method of this invention.

As shown on the drawings:

In FIGURE 1, reference numeral 10 refers generally to the parison injection molding apparatus of the present invention which is quite similar to that disclosed in the above-identified Santelli application. This apparatus includes a block 11 provided with a vertical passage 12 within which is disposed a generally cylindrical injection sleeve 13 having an enlarged head 14 seated upon the block 11. Reciprocal within the sleeve 14 is a vertically displaceable, power-actuated injection piston 15, the actuating rod 16 of which is connected to a suitable source of power (not shown), such as a fluid pressure cylinder. Plasticized material is fed to the interior bore 17 of the sleeve by a feed piston 18 operable in sequence with the piston 15 and receiving such material from an extruder or other source of plasticized material, as through feed aperture 19.

The piston 15 cooperates with an injection mold block 20 having a mold recess 21 therein, the upper end of the recess 21 being closed by a pair of separable neck mold sections 22 cooperably defining upper cylindrical recess portions 23 and lower, appropriately contoured neck-defining recesses 24. It will be noted that the lower portions 25 of the neck mold sections 22 are of reduced diameter and are snugly received by and bottomed in a corespondingly contoured recess 26 formed in the injection mold 20.

Projecting into the mold recess 21 and snugly received by the upper cylindrical portions 23 of the sectional neck mold portions 22 is a core pin 30. This core pin 30 has a depending major portion 31 axially projecting into the vertical mold recess 21 and an upper radially outwardly enlarged flange 32 contacting the exposed upper surfaces of the neck mold segments 22. The core pin is provided with a central, axially extending recess 33 terminating, as at 34, above the bottom of the recess to provide a closed lower end 35 for the core pin.

Preferably, but not necessarily, the core pin 30 has incorporated therein a spirally wound or helical heat exchange coil 36 formed of tubing having good heat exchange properties for the circulation of a heat exchange fluid, such as water, air or the like through the core pin to accurately control the temperature thereof. This coil 36 is provided with a laterally projecting inlet portion 37 through which heat exchange fluid is introduced into the coil and the return reach 38 of the coil extends upwardly through the core pin recess 33 with an outlet end of the coil 39 projecting transversely beyond the lip 32 of the pin.

Figure 3:
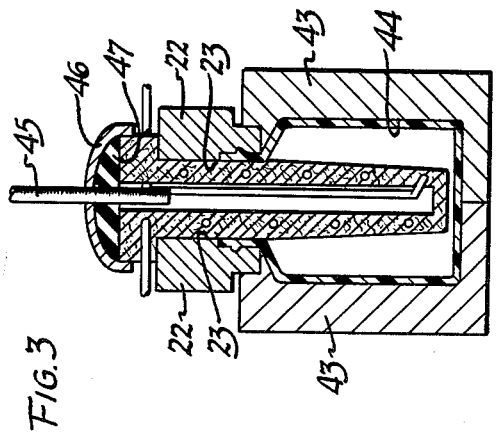
FIGURE 3 is a view similar to FIGURE 2 illustrating the blow molding of the parison within a sectional blow mold.
Figure 2:
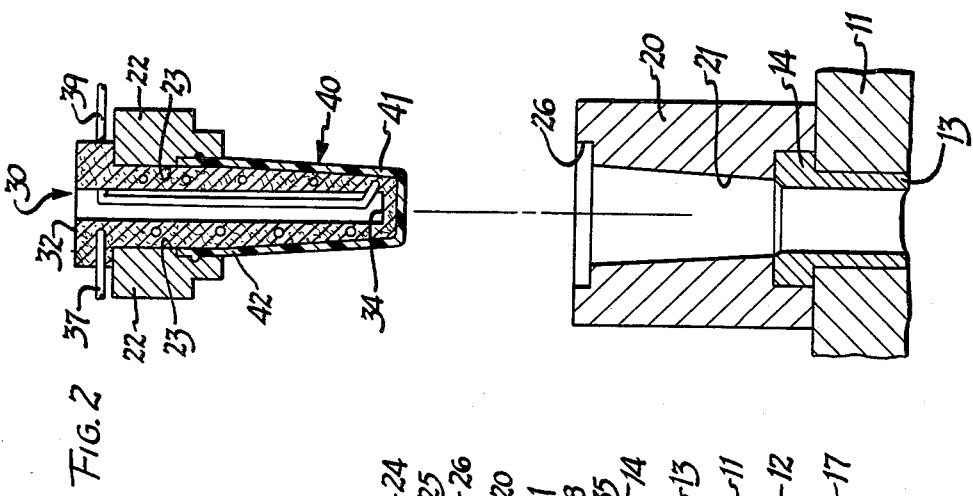
FIGURE 2 is a view similar to FIGURE 1 illustrating withdrawal of the core pin and the surrounding parison from the injection mold.

In carrying out the method of the present invention utilizing the structure of FIGURES 1 through 3, the core pin is initially positioned axially of the injection mold recess 21 to provide therebetween a molding cavity. Plasticized plastic material is introduced into this cavity from the feed passage 19 and by the feed piston 18, so that the piston 15 will transfer the material upwardly into the cavity filling the same. After a period of residence in the cavity the neck mold segments 22 and the core pin 30, together with the injection molded parison 40 surrounding the core pin are stripped vertically by relative core pin-mold movement. It will be noted that the parison 40 includes a lower, blow moldable sleeve portion 41 surrounding the periphery of the core pin portion 31 and extending over the bottom surface thereof and an upper contoured neck portion 42 confined between the neck mold segments 22 and the core pin upper portions.

Next, the sections 43 of a sectional blow mold cooperatively defining an interior cavity 44 of the contour of the desired final article are closed about the core pin 30 and the parison 40. Blow air at appreciable pressure is introduced into the core pin 30 by a suitable means, such as an air pipe 45 having a lateral flange 46 overlying and generally conforming to the flange 42 of the core pin 30 and, if desired, provided with a lower elastomeric, e.g. rubber, seal 47 is entered into the core pin bore 33. Air introduced through the blow pipe 45 enters the bore 33 and passes through the air-permeable core pin to displace the parison 40, and particularly the parison portion 41, radially outwardly from the core pin into contact with the blow mold cavity 44. Upon opening of the blow mold segments 43 and stripping of the parison neck portion 42 from the separable neck mold segment 22 and the core pin 30, the finished article can be removed from the apparatus.

In that modification of the previously described invention illustrated in FIGURES 4 through 6, the injection molding apparatus and method are the same as heretofore described in conjunction with the embodiment of FIGURES 1 through 3 of the drawings. The major departure from the structure of FIGURES 1 through 3 is in the core pin. That form of the core pin 50 illustrated in FIGURE 4 is provided with a peripheral upper flange 51 contacting the upper extremity of the neck mold segments 22. Projecting axially into the recess 33 of the core pin 50 is an air tube 53. This tube having an external diameter substantially the same as the internal diameter of the recess 33 and is provided with radial or lateral air ports 55 adjacent the lower extremity thereof, the lower extremity of the tube 53 preferably being closed by a radial bottom wall 56.

As illustrated, the parison 40 is surrounded by the sectional blow mold 43. By a comparison of FIGURES 4, 5 and 6, the progressive blowing or inflation of the parison 50 will be readily observed as the air tube 53 is withdrawn or retracted axially from the porous metal core pin. The core pin, being porous, readily passes air therethrough, this air traveling primarily laterally through the pin due to the lesser thickness of the porous pin to be traversed in this direction, rather than axially. Accordingly, successive portions of the parison are inflated as the air tube 53 is withdrawn. In this manner, the distribution of the inflatable plastic material in the walls of the final article may be readily controlled, particularly since the exterior surfaces of the core pin can be readily varied in shape to correspondingly vary the shape of the parison to be inflated. Additionally, the progressive inflation of the parison insures the ready removal or "peeling-off" of the parison from the core pin under readily controllable air pressure through the air tube 53.

It will be readily appreciated that the size and shape of the parison to be formed about the core pin can be readily varied, particularly by the use of a sectional injection mold 20 from which the parison need not be axially stripped.

Further, air can either be introduced directly into the porous core pin (as in the embodiment of FIGURES 1 through 3) or by means of an air tube 53 which is retractable for progressively stripping and inflating the parison (as in the embodiment of FIGURES 4–6). If desired, the air tube 53 of FIGURES 4–6 may be provided with additional air ports in the lower wall 56 thereof to aid in stripping the bottom of the parison from the core pin.

The core pin may be formed from any desirable material, although a compact of stainless steel, bronze or "Monel" metal is preferred. If desired, a metallic compact which is later sintered or otherwise treated to provide uniform, minute, air-permeable pores therethrough may be utilized. Other suitable structures may be fabricated from metallic mixtures, such mixtures of iron with copper, with a portion of the mixture being subsequently chemically leached to provide the pores. The pore size may be varied over a wide range, i.e. pore sizes on the order of 0.001 inch or less may be used, with a pore size on the order of 5 microns having proved particularly useful.

One more facet of the present invention is illustrated by the possibility of introducing a liquid or air-dispersed mold release agent into the porous metal core pin for travel or leakage through the pores to the outer surface of the core pin to additionally inhibit adherence of the parison to the core pin. In this manner, sticking of the parison to the core pin may be positively eliminated, and ready stripping of the parison during blowing can be insured.

The advantages of the present invention will be readily apparent to those skilled in the art inasmuch as the problem of sticking of the injection molded parison to the core pin is prevented, while the parison may be either uniformly or selectively inflated to insure proper blowing to final configuration. The possibility of a "blow-out" of the parison is positively prevented, and the utilization of a mold release agent is rendered possible. The wall thickness of the parison can be varied, either axially of the core pin or peripherally thereof, to conform to the shape of the blow mold cavity or to yield a desired inflation pattern or to yield a desired uniform or differential wall thickness in the final article.

While the invention has been illustrated in the blowing of a container, it will be appreciated that any desired blow molded article, such as toys or the like, may be made by the method and apparatus herein disclosed.

What is claimed is:

1. In a method of making a plastic article from a parison surrounding an air permeable core having a central axial recess, the steps of disposing the core and the parison interiorly of a blow mold, said core recess having an axially movable air tube inserted thereinto and having transverse openings, and simultaneously injecting air into the tube and moving the air tube in said recess to progressively inflate the parison by air passing through the tube openings and hence radially through said core.

2. In a method of making a plastic article from an injection molded parison surrounding a fluid permeable core pin having a central axial recess, the steps of disposing the core pin and the surrounding parison interiorly of a blow mold, and injecting fluid under pressure into the core pin recess, the fluid injecting step being carried out by fluid injected radially through axially spaced portions of the core pin to progressively inflate the parison.

3. In a method of making a plastic article, the steps of disposing an air-permeable core pin and a surrounding air-expansible parison interiorly of a blow mold, the core pin having a central air passage and progressively inflating the parison by air radially passing through the air-permeable core pin from a blow tube inserted into the air passage and displaced axially relative to the core pin.

4. In a method of making a plastic article, the steps of injection molding a parison about a porous core pin having a central axial recess, disposing the core pin and the parison interiorly of a blow mold, inserting an axially movable air tube into the core pin recess, and injecting air into the parison by its radial passage through the porous core pin from the blow tube as the blow tube is axially displaced relative to the core pin to progressively inflate the parison.

References Cited in the file of this patent

UNITED STATES PATENTS

| | | |
|---|---|---|
| 2,801,150 | Koryta | July 30, 1957 |
| 2,811,408 | Braley | Oct. 29, 1957 |

FOREIGN PATENTS

| | | |
|---|---|---|
| 154,343 | Australia | Nov. 27, 1953 |
| 221,038 | Australia | Mar. 27, 1958 |
| 684,611 | Great Britain | Dec. 24, 1952 |
| 1,135,341 | France | Apr. 26, 1957 |
| 1,192,475 | France | Oct. 27, 1959 |